June 2, 1925.
H. T. COSTA
GOLD SEPARATOR
Filed Sept. 15, 1923
1,540,543
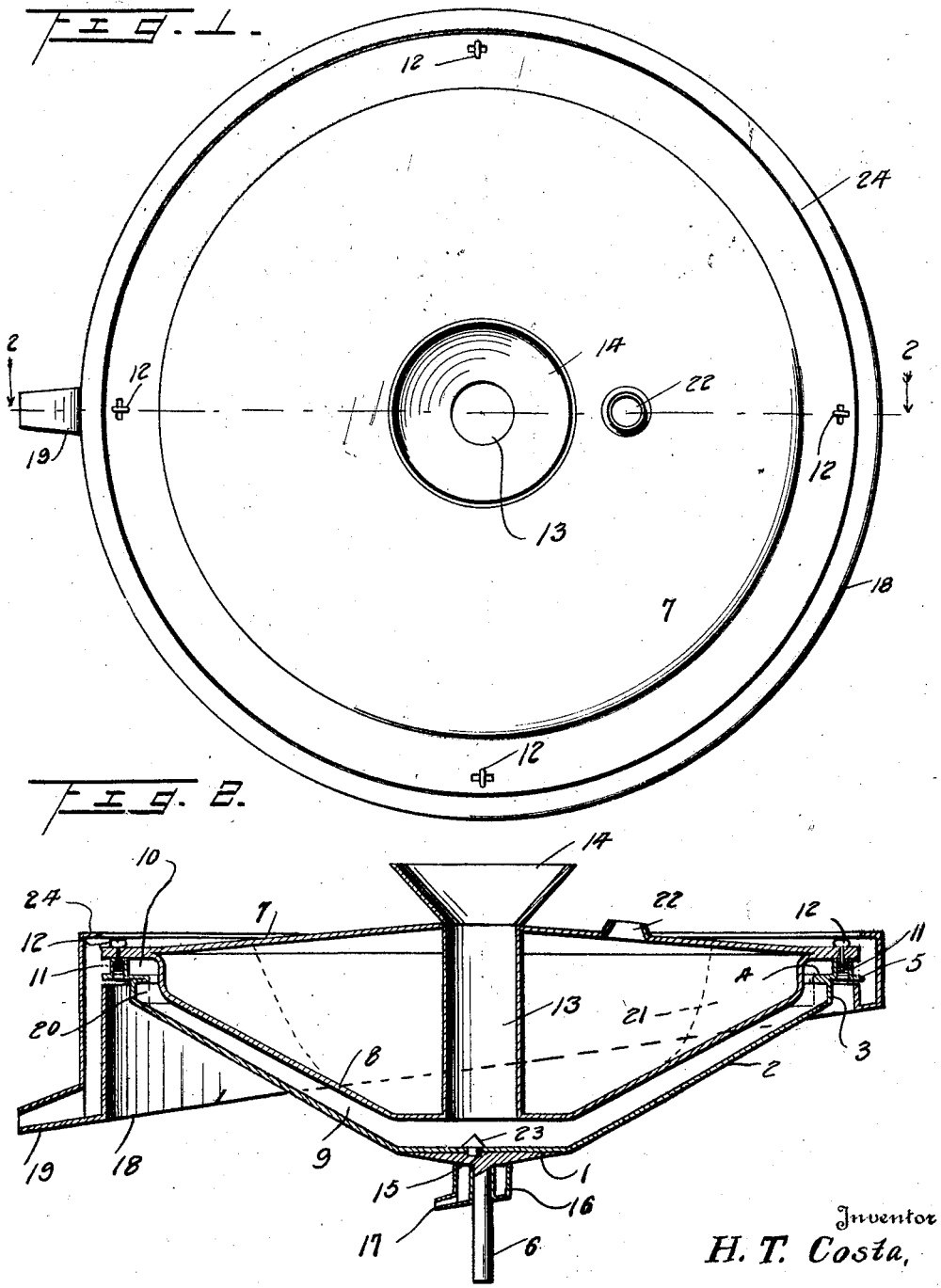
Inventor
H. T. Costa, Patented June 2, 1925.

1,540,543

UNITED STATES PATENT OFFICE.

HARRY T. COSTA, OF GRANTS PASS, OREGON.

GOLD SEPARATOR.

Application filed September 15, 1923. Serial No. 662,928.

*To all whom it may concern:*

Be it known that I, HARRY T. COSTA, a citizen of the United States, residing at Grants Pass, in the county of Josephine and State of Oregon, have invented certain new and useful Improvements in Gold Separators; and I do hereby declare the following to be a full, clear, and exact description of the invention, such as will enable others skilled in the art to which it appertains to make and use the same.

The invention relates to means for separating precious metals such as gold and silver from ore and other medium by a combined centrifugal action and a process of amalgamation.

The principal object of the invention is to prevent any material loss of mercury and to recover particles of gold tending to float and to obviate loss from a stripping of the plate.

The invention furthermore has for its object the provision of a device for recovering metals heavier than mercury, the latter operating as a separating medium between the metal to be recovered and the slime and other refuse which passes off with the water.

The invention furthermore aims to eliminate ore and thereby compel particles of gold to separate by gravity and centrifugal action.

A further purpose of the invention is the provision of a device which utilizes a wall of mercury as the separating means, the container such as a rotary pan traveling at a higher rate of speed than the wall of mercury with the result that the latter at all times presents a clean surface whereby to act quickly in the separation of precious metals by amalgamating therewith.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application:

Figure 1 is a top plan view of an ore separator embodying the invention, and

Figure 2 is a vertical section on the line 2—2 of Figure 1.

Corresponding and like parts are referred to in the following description and designated in both views of the drawings by like reference characters.

The device comprises a circular pan including a flat central portion 1, an upwardly and outwardly inclined portion 2, a vertical wall 3, an inwardly disposed flange 4, and an outwardly disposed flange 5, both flanges 4 and 5 being in the same horizontal plane. This pan consists preferably of cast aluminum which is machined and polished upon its inner or top side and which side is copper plated and finished with a silver plate. A vertical shaft 6 depends from the pan and is mounted in suitable bearings and adapted to receive motion from a suitable source of power, whereby the pan may be rotated at not less than one hundred revolutions per minute. The pan is closed by means of a hollow cover which includes a top 7 and a bottom 8, the latter conforming to the pan and spaced therefrom to provide a passageway 9 which conforms to the outline of the pan and terminates in an annular discharge 10 formed between the marginal portions of the pan and cover. Spacers 11 separate the pan and cover and suitable fastening means 12 secure the cover when properly positioned upon the pan. A vertically disposed feed tube 13 is located centrally of the cover and its lower end opens into the space or passageway 9. A funnel 14 is located at the upper end of the tube 13 and is adapted to receive the ore and water. The top 7 of the cover is deflected upwardly and the tube 13 operates as a brace between the top 7 and bottom 8. A discharge opening 15 is located centrally of the pan and is deflected laterally to clear the shaft 6 and discharge into a launder 16 provided with a spout 17 to deliver the material into a suitable receptacle when it is required to clean the device.

A launder 18 encircles the pan and cover and its bottom is inclined laterally to a common point of discharge at which is located a spout 19 for delivering the water and other waste at a predetermined point. The launder 18 extends above the top of the pan and its cover and is hollow and provided upon its inner wall with an opening to receive the waste from the separator.

The numeral 20 designates a mobile wall of mercury normally disposed adjacent the outer vertical wall 3 of the separating pan when the latter is in operation and confined between the inwardly disposed flange 4 and the outer marginal portion of the upwardly and outwardly inclined part 2. The mercury occupies the position indicated in Figure 2 by reason of centrifugal action and rotates with the pan but at a less speed and as a result the surface of the mercury is clean and bright throughout its extent and in condition to operate quickly in recovering gold or silver. The outer portion of the cover contains water 21, which operates as a bond and is likewise maintained in the position indicated by the dotted lines in Figure 2 by centrifugal action. A filling opening 22 in the top 7 of the cover provides for supplying water to the space formed between the top 7 and bottom 8.

In the operation of the device, ore and water are supplied to the separating pan through the funnel 14 and filling tube 13 and, entering the space 9, pass upwardly and outwardly therethrough, the metal being gradually separated by gravitative and centrifugal action. The metal tends to approach the pan and upon reaching the marginal portion thereof passes between the annular wall of mercury 20 and the vertical wall 3 of the pan. The water and refuse pass upwardly upon the inner wall of the mercury 20 and escape through the annular outlet 10 into the launder 18 and pass off therefrom through the spout 19. Mercury may be supplied at regular intervals or as required through the filling tube 13. The outlet 15 is closed by means of a conical plug 23 which operates as a spreader to deflect the ore and water outwardly in the space 9. To clean the separator, the supply thereto is shut off and the pan rotated until all discharge ceases, after which the cover is removed and the plug 23 displaced so that the amalgam and other accumulation may discharge through the outlet 15 into the launder 16 and through the spout 17 thereof into a receptacle, not shown, arranged to receive the same. A squeegee or other means may be employed for removing the material from the pan and effecting a discharge thereof through the outlet 15.

What is claimed is:

1. A separator of the class described having a pan of inverted frusto-conical shape, a launder associated therewith, a cover for said pan and conforming to the shape thereof, said cover having spaced walls and adapted to contain water, said cover having an inlet for the water, and a supply tube for the cover spanning said walls and reinforcing the cover.

2. A separator of the class described having a pan of inverted frusto-conical shape, said pan having an inwardly extending flange at its upper end to coact with mercury and an outwardly extending flange in line with the first mentioned flange, a launder to which the second mentioned flange leads, a cover having a portion disposed over said flanges, separable fastening means between said cover and one of said flanges, said launder extending above said portion and having an inwardly extending flange to cover its space, said cover being removable and insertable through the openings bounded by the last mentioned flange, said pan at its frustum having an outlet passageway, a plug normally covering said passageway and operable when the cover is removed, and a launder in communication with said pasageway.

In testimony whereof I affix my signature in presence of two witnesses.

HARRY T. COSTA.

Witnesses:
E. T. McKIMBRY,
W. H. GILES.